TRANSMISSION CONTROL IN TWO-WAY SIGNALING SYSTEM

Filed Nov. 2, 1950 3 Sheets-Sheet 1

INVENTOR
O. R. GARFIELD
BY Earl C. Laughlin
ATTORNEY

March 17, 1953 O. R. GARFIELD 2,632,052

TRANSMISSION CONTROL IN TWO-WAY SIGNALING SYSTEM

Filed Nov. 2, 1950 3 Sheets-Sheet 2

INVENTOR
O. R. GARFIELD
BY
Earl C. Laughlin
ATTORNEY

March 17, 1953 O. R. GARFIELD 2,632,052

TRANSMISSION CONTROL IN TWO-WAY SIGNALING SYSTEM

Filed Nov. 2, 1950 3 Sheets-Sheet 3

INVENTOR
O. R. GARFIELD
BY Earl C. Laughlin
ATTORNEY

Patented Mar. 17, 1953

2,632,052

UNITED STATES PATENT OFFICE 2,632,052

TRANSMISSION CONTROL IN TWO-WAY SIGNALING SYSTEM

Owen R. Garfield, Chatham, N. J., assignor to Bell Telephone Laboratories, Incorporated, New York, N. Y., a corporation of New York Application November 2, 1950, Serial No. 193,683

4 Claims. (Cl. 178—44)

Figure 1:
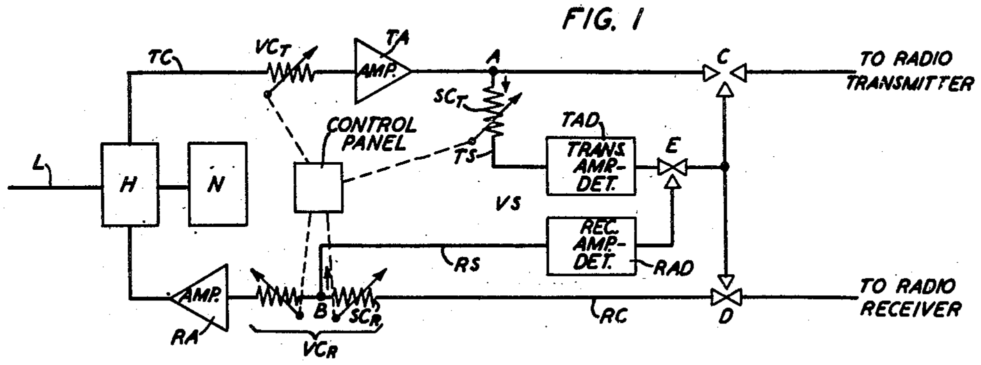

The invention relates to signal wave transmission systems and particularly to arrangements for controlling signal transmission in a two-way telephone system including an intermediate transmission link subject to varying noise or other interference, such as a radio or carrier link.

The invention is specifically applicable to, although not limited to, a control terminal for use at each end of a radio telephone system to control speech signal transmission between the radio equipment and an associated two-wire telephone plant. The primary function of such a control terminal is to insure the optimum ratio of useful signal to the noise introduced by the radio link. This purpose is accomplished chiefly by the use of speech volume regulation in the two one-way amplifying paths of the terminal respectively outgoing to the radio transmitter and incoming from the radio receiver. Such a terminal may also include a switching device, known as a vodas (voice-operated device, anti-singing), responsive to the talking currents of the telephone subscribers associated with opposite ends of the system to so control the transmission characteristics of the oppositely-directed amplifying paths of the terminal as to suppress echoes and prevent "singing" around the four-wire loop formed by these paths, and prevent reradiation of the portion of the voice signal energy incoming from the radio receiver transmitted into the outgoing amplifying path due to imperfect balance of the hybrid coil arrangement employed in the terminal. Proper operation of such a control terminal also requires the provision of equipment to enable the adjustment of the sensitivities of the transmitting and receiving vodas branches from time to time to take account of varying line and radio noise conditions.

In one type of control terminal heretofore used, the volume regulating and sensitivity controls comprise separate manually operable variable attenuators in the signal transmitting and receiving paths and in the inputs of the two vodas branches, respectively, which are independently adjusted by the technical operator from time to time as service conditions vary. A disadvantage of this type of control terminal is the difficulty of determining accurately and quickly the correct adjustment of the variable attenuator in the signal receiving path, which is a function of the settings of the other three variable attenuators. In another control terminal of the prior art, the required speech signal volume regulation and vodas sensitivities are obtained by an automatic gain adjusting device in the signal transmitting path, separate variable attenuators in the transmitting and receiving vodas branches manually adjusted by the technical operator, and a relatively complex and expensive electrically-operated control means automatically responsive to these separate adjustments to adjust the loss in the signal receiving path to the proper value which is proportional to the algebraic sum of the effects of the three other controls.

An object of the invention is to improve a control terminal of the above-described general type from the standpoint of simplification and reduction in the cost of the control equipment.

A related object is to provide with simple and economical equipment, maximum gain in the incoming and outgoing signal transmission paths of a control terminal for a two-way radio or carrier telephone system consistent with the maintenance of anti-singing conditions and discrimination against echoes, line noise and other types of interference such as that arising in a radio path of the system.

Another object is to limit the volume level of speech signals received by a telephone subscriber through a control terminal of a two-way radio telephone system to a maximum value which will not be irritating to the ear of that subscriber.

These objects are attained in general by the provision of suitable mechanical linkages between different portions of variable attenuation means in the signal receiving path and each of three separate manual controls for variable attenuators located respectively in the inputs of the signal transmitting path and the vodas transmitting and receiving branches. The three manual controls are separately adjusted by the technical operator to change the loss values of the attenuators directly controlled by them in steps until the transmitted signal volume in the signal transmitting path and the sensitivities of the two vodas branches are brought to the necessary values for proper operation of the terminal under the existing service condition. This, through the mechanical linkage, will cause the loss values of attenuators in the signal receiving path to be automatically adjusted to make the net loss of that path of the optimum value both to maintain satisfactory echo margin in the terminal and limit the received signal volume at a subscriber station connected to the terminal to the maximum value tolerable to the ear of the subscriber at that station.

In one embodiment of the invention, the shafts of three separate manually rotatable dials operating as the manual controls are respectively mechanically connected to the movable arms of variable resistance attenuators in the signal transmitting path, the input of the vodas transmitting vodas branch and in the signal receiving path in front of the point of connection of the vodas receiving branch to that path in such manner that the technical operator by turning the respective dials in the proper direction may adjust the loss values of the controlled attenuators to bring the transmitted signal volume and the sensitivities of the two vodas branches to the desired values. The shaft of the dial controlling the variable attenuator in the signal transmitting path and the shaft of the dial controlling the attenuator in the vodas transmitting branch are also respectively coupled to the movable arms of separate variable attenuators connected in tandem in the signal receiving point beyond the point of connection of the vodas receiving branch to that path, in such manner that the loss values of the latter attenuators are automatically adjusted to produce compensating loss changes in the signal receiving path such as to maintain echo margin for any adjustment of the three dials. A differential gearing arrangement is utilized to effectively interlock the several variable attenuators in the signal receiving path in proper phase relation so that their losses are effectively algebraically added, and other mechanical means including a spring arrangement is utilized to effectively provide slipping between the several interlocked attenuators in the signal receiving path over the high received volume portion of the adjusted range so that the net loss in that path is made such as to give as high a signal output for that path as possible while preventing the received signal volume at a subscriber station connected to the terminal from going above the maximum comfort value for a listening subscriber.

Figure 2:
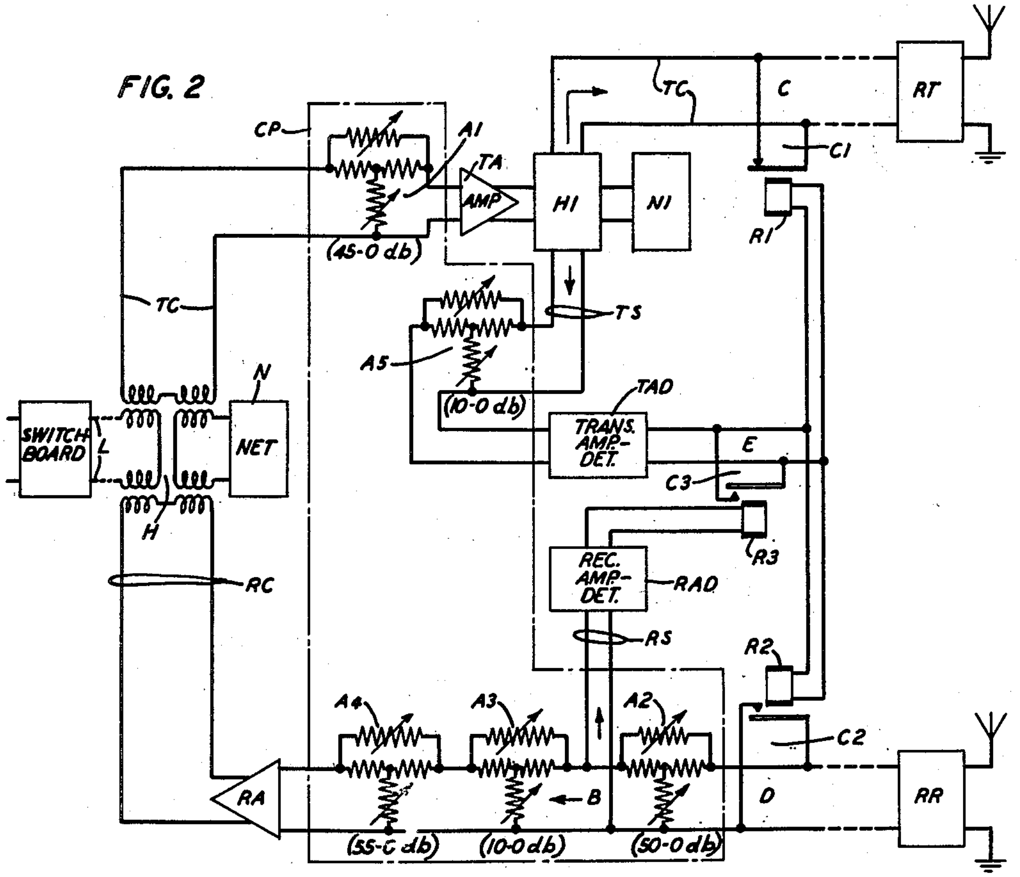
Figure 3:
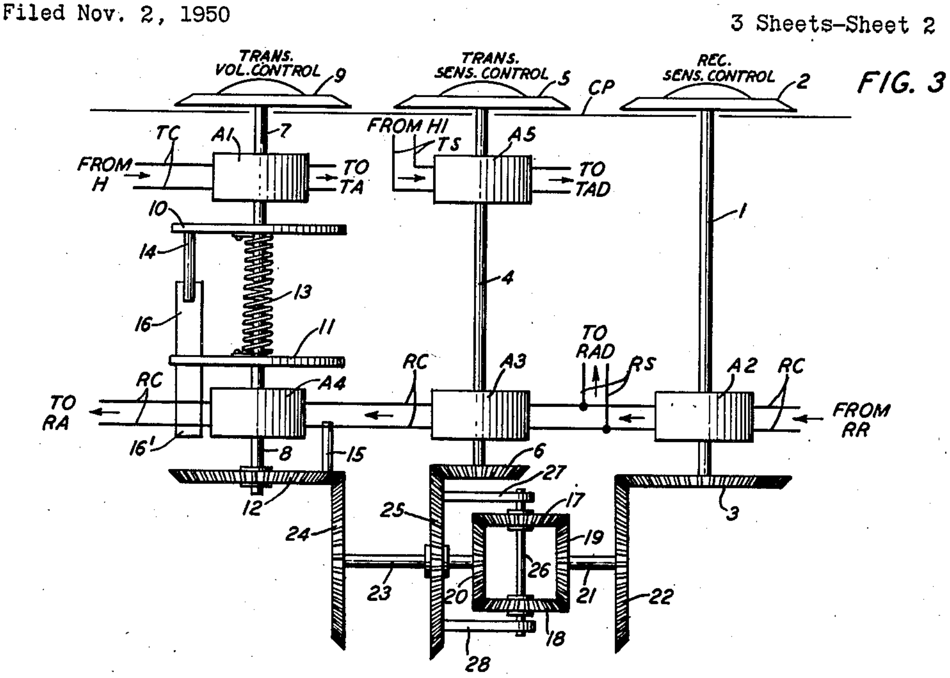
Figure 5:
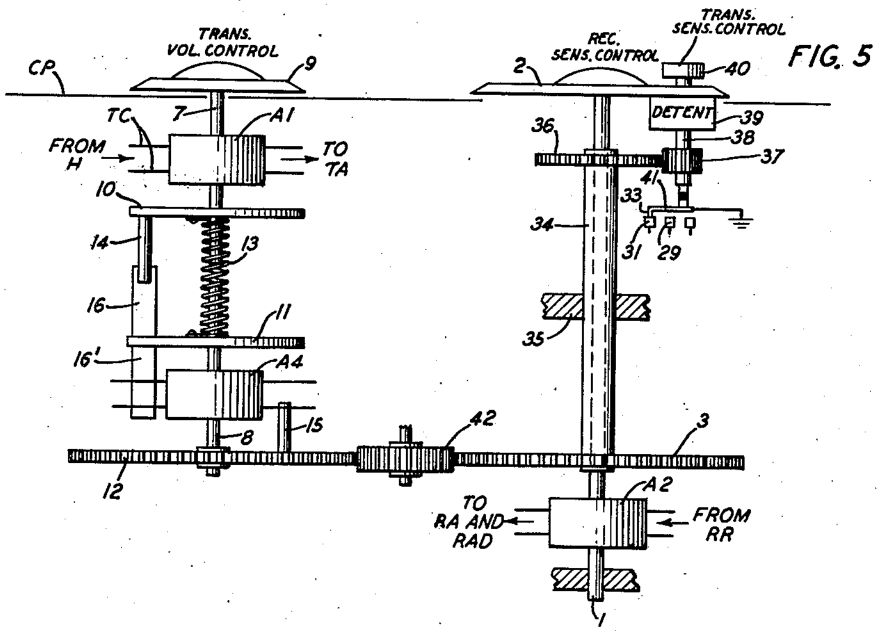
Figure 4:
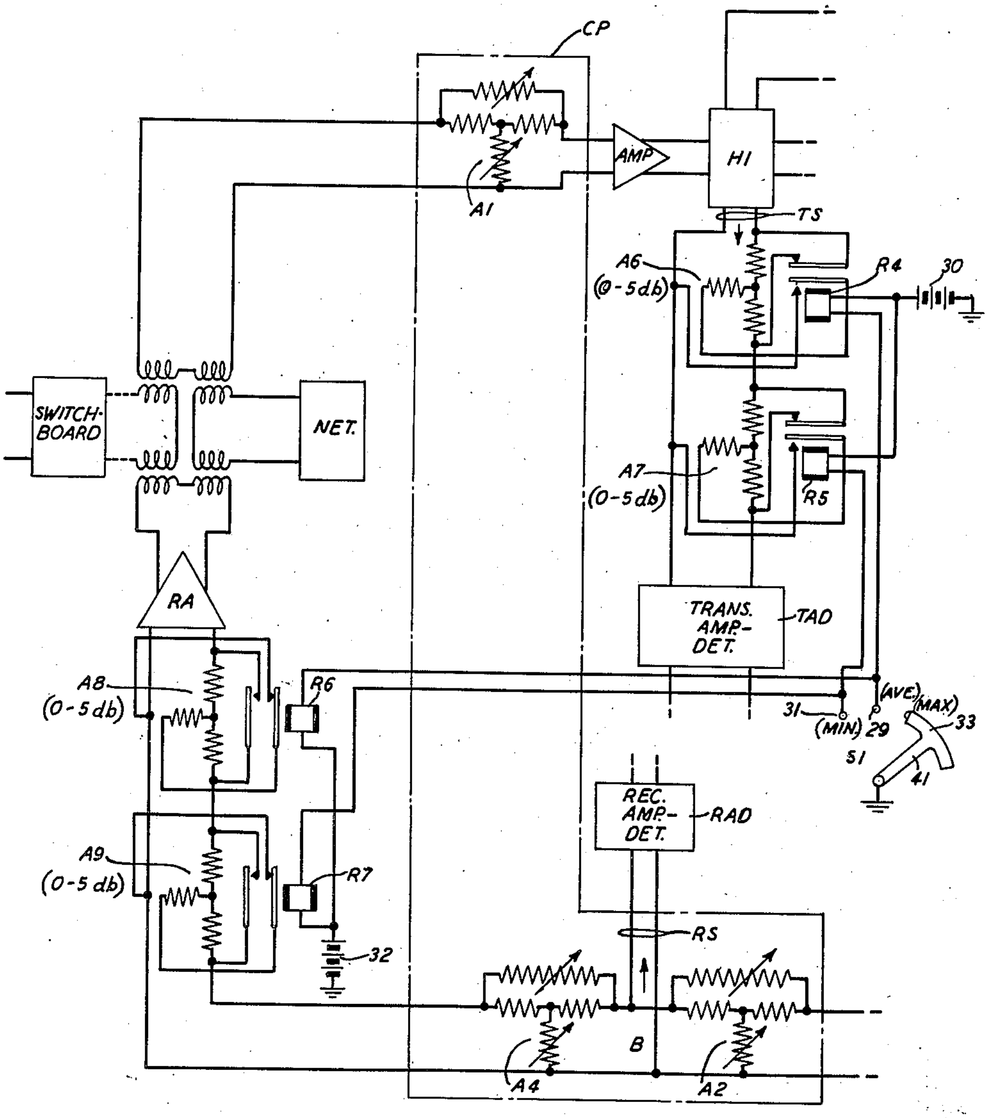

The various objects and features of the invention are explained in detail in the following complete description thereof to be read in conjunction with the accompanying drawings in which:

Fig. 1 shows a single line functional schematic of a radio control terminal of the general type to which the invention is applicable;

Figs. 2 and 3 in combination show schematically control equipment in accordance with one embodiment of the invention applied to such a control terminal; and Figs. 4 and 5 in combination show control equipment in accordance with an alternative embodiment of the invention applied to a control terminal of the type illustrated in Fig. 1.

In the functional schematic of Fig. 1 each solid line represents a two-wire transmission path, and the transmission apparatus associated with each transmission path is illustrated by diagrammatic representations of their functions or appropriately labeled boxes. Contacting arrowheads in a transmission path indicate that the path at that point is normally made or enabled, and separated arrowheads in a transmission path indicate that the path at that point is normally broken or disabled. An arrow directed toward a make point (contacting arrowheads) in a transmission path from a box indicates that the path will be disabled by operation of the apparatus represented by the box and an arrow directed toward a break point (separated arrowheads) in a transmission path from a box indicates that the path will be enabled by operation of the apparatus represented by the box.

The control terminal of Fig. 1 is essentially a four-wire terminating circuit for a radio telephone system. As indicated, this four-wire circuit comprises a transmitting circuit TC leading to a radio transmitter and a receiving circuit RC leading from a radio receiver. The input of the transmitting circuit TC and the output of the receiving circuit RC are connected in substantially conjugate relation with each other and in transmission relation with the two-way circuit or line section L by a hybrid coil H and associated balancing network N in well-known manner. The two-way circuit or line section L may connect to a telephone switchboard in a normal two-wire telephone plant (not shown). The transmitting circuit TC includes in its input a transmitting volume control $VC_T$ and the following transmitting amplifier TA. The receiving circuit RC includes the receiving volume control $VC_R$ and the following receiving amplifier RA. Associated with this four-wire circuit is a voice-operated switching device or vodas VS for suppressing echoes and preventing singing, including a transmitting branch TS having its input connected across the transmitting circuit TC at some point A between the output of the transmitting amplifier TA and the radio transmitter, and a receiving branch RS having its input connected across the receiving circuit RC at a point B in front of the receiving amplifier RA. A portion of the receiving volume control $VC_R$ connected in front of the point of connection of the receiving vodas branch RS to TC is effectively in the input of the receiving vodas branch RS and may be used as a sensitivity control $SC_R$ for the receiving amplifier-detector RAD in that branch. The transmitting vodas branch TS includes the transmitting amplifier-detector TAD and the sensitivity control $SC_T$ therefor in the input to TAD.

In the absence of outgoing speech signals received from the two-way circuit L, the transmitting circuit TC is disabled or blocked at the point C beyond the point A of connection of the transmitting vodas branch TS thereto, as indicated, and the receiving circuit RC is operative to transmit speech signals incoming from the radio receiver to the receiving amplifier RA and to the input of the receiving branch RS of the vodas VS, as indicated. Outgoing speech signals received over the two-way line L from a telephone subscriber will be impressed by the hybrid coil H on the input of the transmitting circuit TC and will pass thereover through the transmitting volume control $VC_T$ and the transmitting amplifier TA towards the radio transmitter. One energy portion of these signals diverted at the point A into the transmitting vodas branch TS will pass through the transmitting sensitivity control $SC_T$ to the transmitting amplifier-detector TAD in which it will be amplified and rectified, and the rectified signal energy in the output of the latter will cause the transmitting circuit TC to be enabled at the point C and the receiving circuit RC to be disabled at the point D. This will permit the other energy portion of the outgoing speech signals in the circuit TC to be transmitted, with the amplification provided by the transmitting amplifier TA, to the radio transmitter for radiation thereby.

While the circuit RC is maintained disabled at the point D by operation of the transmitting amplifier-detector TAD, speech signals or noise energy thereafter received over the circuit RC from the radio receiver will be prevented from entering the receiving vodas branch RS or from being fed back through the output of receiving circuit RC, hybrid coil H and transmitting circuit TC to cause false operation of the transmitting vodas branch TS or to set up a singing condition around the four-wire circuit.

If the speech signals of a distant subscriber are received over the circuit RC from the radio receiver during a time interval in which that circuit is held enabled at the point D, due to non-operation at that time of the transmitting amplifier-detector TAD by outgoing speech signals, the main portion of the received signals after passing through the receiving volume control $VC_R$ and being amplified in the receiving amplifier RA will be passed from the output of the receiving circuit RC through the hybrid coil H to the two-way line section L over which it will be transmitted to the listening telephone subscriber's line connected thereto through the associated telephone switchboard. Another energy portion of the received speech signals will be diverted from the receiving circuit RC at the point B into the receiving vodas branch RS in which it will be amplified and rectified by the receiving amplifier-detector RAD. The rectified signal output of RAD will cause the transmitting vodas branch TS to be effectively disabled at the point E in its output. Thus, while RAD remains operated by the applied received speech signals, subsequent operation of the transmitting amplifier-detector TAD by outgoing speech signals from the line section L or by echoes of received speech signals incoming from the radio receiver, due to the effective disablement of TS at the point E, cannot result in the disabling of the receiving circuit RC at the point D to cut off the received signals, or the enabling of the transmitting circuit TC at the point C to permit the outgoing speech signals or echoes to pass to the radio transmitter.

Proper operation of such a control terminal under all service conditions requires adjustment from time to time of the transmitting volume control $VC_T$ in the signal transmitting circuit TC, the receiving volume control $VC_R$ in the signal receiving circuit RC, the transmitting sensitivity control $SC_T$ in the input of the transmitting vodas branch TS and the receiving sensitivity control $SC_R$ in the input to the receiving vodas branch RS. The functions of each of these controls will now be described.

The transmitting volume control $VC_T$ is provided to enable adjustment of the signal input to the radio transmitter to a relatively constant volume in order to fully load the radio transmitter for all subscribers without excessive signal distortion regardless of whether the talker's speech is "strong" or "weak," and whether the connecting land line to the talker's station is long or short, and to maintain the signal-to-noise ratio for the radio portion of the circuit as high as possible. This control is adjusted by the technical operator frequently during a conversation to maintain a normal reading on a volume indicator (not shown) connected across the transmitting circuit TC.

The transmitting sensitivity control $SC_T$ is provided to enable adjustment of the sensitivity of the transmitting amplifier-detector TAD in the transmitting vodas branch TS as high as practicable to avoid clipping of outgoing speech while substantially preventing false operation of the transmitting vodas branch by land line noise. The correct setting of this control would be determined by monitoring on this vodas branch and it should be adjusted approximately once for each conversation. The receiving sensitivity control $SC_R$ is provided to enable adjustment of the sensitivity of the receiving vodas branch RS as high as possible consistent with preventing false operation of this branch by incoming static from the radio circuit. This is necessary to insure that the highest permissible receiving volume is delivered to the local subscriber for any particular setting of the transmitting volume control $VC_T$ and the transmitting sensitivity control $SC_T$. The correct setting is determined by the technical operator by monitoring on this vodas branch between calls and noting false operations of the receiving amplifier-detector RAD by static.

The receiving volume control $VC_R$ is provided to enable adjustment of the attenuation in the receiving circuit RC mainly to maintain the received signal volume delivered to the local subscriber at the maximum value consistent with satisfactory echo margin. The echo margin requirement may be determined as follows. The sensitivity of the receiving amplifier-detector RAD, as seen from the radio receiver, should always equal or exceed the sensitivity of the transmitting amplifier-detector TAD, as seen from the radio receiver, so that noise or speech energy incoming from the radio receiver is either of too low amplitude to result in the operation of either amplifier-detector or will operate the receiving amplifier-detector RAD to cause the transmitting vodas branch TS to be disabled at E in the manner previously described. Consequently, the transmitting amplifier-detector TAD should never be operated by echoes of the speech signals or noise incoming from the radio receiver transmitted into the signal transmitting circuit TC through the hybrid coil H, and the received speech signals should not be self-mutilated. The margin by which this requirement is met is called echo margin and may be defined as the difference, expressed in decibels, between the volume delivered by the control terminal to the two-wire line section or circuit L under a given set of service conditions and the maximum volume which could be delivered thereto by reducing the loss in the signal receiving circuit RC without producing echo operation of the transmitting vodas branch TS. It may be calculated from the following formula:

$$\text{Echo margin} = S_R - S_T + L_R + L_T \text{ in decibels} \quad (1)$$

where $S_R$=the sensitivity of the receiving amplifier-detector RAD as measured at the radio receiver;

$S_T$=the sensitivity of the transmitting amplifier-detector TAD as measured from the point A; and $L_R+L_T$=the net loss around the loop from the radio receiver through the signal receiving circuit RC, the hybrid coil H and the signal transmitting circuit TC to the point A.

The adjustments of three of the above-defined controls, i. e., the transmitting volume control $VC_T$, the transmitting sensitivity control $SC_T$ and the receiving sensitivity control $SC_R$, are dependent on factors within the power of the technical operator to control. The adjustment of the receiving volume control $VC_R$, however, is dependent upon the adjustments of the other three controls. In addition to the need for meeting the echo margin requirement discussed above, for proper operation of the control terminal, it is necessary to limit the volume of the received signal energy delivered to a listening subscriber from the signal receiving circuit RC through the hybrid coil H, the two-wire line section L and an associated switchboard to a maximum value which will not be irritating to the ear of that subscriber when reproduced by his telephone receiver. The proper relative adjustments of the volume controls $VC_T$ and $VC_R$ and the sensitivity controls $SC_T$ and $SC_R$ are attained by properly coupling these controls through a control panel operated by the technical operator, as indicated diagrammatically in Fig. 1.

Fig. 2 shows schematically a radio control terminal of the general type illustrated diagrammatically in Fig. 1 equipped with a control panel in accordance with the invention, represented by the dot-dash box designated CP, including an arrangement of variable attenuators in the transmission paths, and a mechanical linkage therebetween for automatically adjusting the net loss of the receiving circuit RC of the terminal to the desired value to meet both of the above requirements. The elements of the control terminal of Fig. 2 corresponding to the same elements in the diagrammatic showing of Fig. 1 are designated by the same reference characters. A detailed showing of a mechanical linkage on the control panel CP in accordance with one embodiment of the invention is given in Fig. 3 to be described in conjunction with Fig. 2.

The transmitting circuit TC of the radio control terminal of Fig. 2 includes in order between the hybrid coil H and the radio transmitter RT, reading from left to right: the manually-controlled variable resistance attenuator A1; the transmitting amplifier TA; the hybrid coil H1 and associated balancing network N1 for connecting the input of the transmitting vodas branch TS in receiving relation with respect to the output of the transmitting amplifier TA and in substantially conjugate relation with the output portion of TC leading to the radio transmitter RT; and the normally closed short-circuiting connection C1 across the circuit TC at the point C, which, when closed, is adapted to effectively disable that circuit at that point. The receiving circuit RC of the control terminal includes between the radio receiver RR and the hybrid coil H, reading from right to left, a normally open short-circuiting connection C2 across the circuit RC at the point D, which, when closed, is adapted to effectively disable the circuit RC at that point; the variable resistance attenuator A2 connected between the points D and B; the variable resistance attenuators A3 and A4 connected in tandem in the circuit RC beyond the point B; and the receiving amplifier RA.

The transmitting vodas branch TS includes a manually-controlled variable resistance attenuator A5 in its input; the following transmitting amplifier-detector TAD; and the switching relays R1 and R2 connected in parallel to the output of TAD and operatively responsive to the rectified output of the latter when voice signals are applied to its input, to respectively open the short-circuiting connection C1 across the circuit TC at the point C to enable that circuit, and to close the short-circuiting connection C2 across the circuit RC at the point D to effectively disable the latter circuit at that point. The receiving vodas branch RS having its input connected across the receiving circuit RC at the point B includes the receiving amplifier-detector RAD and the switching relay R3 operatively responsive to the rectified output of the latter when voice signaling energy is applied to its input from the receiving circuit RC, to close the short-circuiting connection C3 across the output of the transmitting vodas branch TS at the point E to effectively disable the transmitting switching relays R1 and R2.

The variable attenuator A1 with its control, shown in Fig. 3, operates as the transmitting volume control $VC_T$ of Fig. 1. The variable attenuator A5 with its control, shown in Fig. 3, operates as the transmitting sensitivity control $SC_T$ of Fig. 1. The variable attenuator A2 with its control, shown in Fig. 3, operates as the receiving sensitivity control $SC_R$ of Fig. 1. The variable attenuators A2, A3 and A4 with their controls, shown in Fig. 3, operate in combination as the receiving volume control $VC_R$ of Fig. 1.

Each of the variable attenuators A1 to A5 in the control panel CP, as indicated diagrammatically in Fig. 2, may be of the bridged-T variable resistance type the loss value of which in the circuit in which it is connected is adapted to be changed in steps by simultaneous adjustment of the two movable control arms of the network to cut in or out resistance in the series and shunt branches of the network, respectively. In the practical embodiments of the invention to be described, the range of adjustments of the variable attenuators A1, A2, A3, A4 and A5 are 0–45, 0–50, 0–55, 0–10 and 0–10 decibels, respectively, each step of adjustment for the attenuators A1, A2, A3, A4 and A5 equaling 2.5 decibels.

Level tables for the proposed semiautomatic radio control terminal in accordance with the invention shown in Fig. 2 are given below. The assumptions for this terminal are: a speech volume of +6VU to the radio transmitter RT; a speech volume of +10VU from the radio receiver RR; an assumed talker volume $V_T$ from the land line L in the range from −29VU to +16VU; a maximum received volume $V_R$ delivered to the land line L of −9VU; a gain of 39 decibels for the transmitting amplifier TA and of 40 decibels for the receiving amplifier RA; a maximum sensitivity $S_T$ for the transmitting amplifier-detector TAD as seen from the radio transmitter RT of 25 decibels (i. e., it will operate for a 1000-cycle tone of −25 dbm) which can be reduced by 10 decibels by adjustment of the attenuator A5; a maximum sensitivity $S_R$ for the receiving amplifier-detector RAD at the input of the receiving vodas branch RS of 44 decibels (i. e., it will operate for a 1000-cycle tone of −44 dbm) which can be reduced by 50 decibels by adjustment of the attenuator A2; a return loss at the land line L of 0 decibels; a loss across the hybrid coil H from the receiving circuit RC to the transmitting amplifier-detector TAD when each of the attenuators A1 to A5 are adjusted to provide 0 decibel loss, of −71 decibels (combined gain of amplifiers TA and RA of 79 decibels minus hybrid coil loss of 8 decibels). In the tables below the adjusted settings of attenuators A1, A2, A3 and A4 are given in decibels under correspondingly labeled headings. The echo margin EM is computed from Formula 1.

$$EM = S_R - S_T + L \text{ (sum of losses } A1 \text{ to } A4 + C)$$

in decibels. The tables show the eight extreme conditions, maximum and minimum, of $V_T$, $S_T$ and $S_R$.

| $V_T$ (VU) | A5 (db) | $S_R$ (db) | $S_T$ (db) | A1 (db) | A2 (db) | A3 (db) | A4 (db) | C (db) | EM (db) | $V_R$= 46−A2−A3−A4 (VU) |
|---|---|---|---|---|---|---|---|---|---|---|
| −29 | 0 | 44 | −25 | 0 | 0 | +10 | +45 | −71 | +3 | −9 |
| −29 | 0 | −6 | −25 | 0 | +50 | +10 | +45 | −71 | +3 | +59 |
| +16 | 0 | 44 | −25 | +45 | 0 | +10 | 0 | −71 | +3 | +36 (1) |
| +16 | 0 | −6 | −25 | +45 | +50 | +10 | 0 | −71 | +3 | −14 |
| −29 | 10 | 44 | −15 | 0 | 0 | 0 | +45 | −71 | +3 | +1 (2) |
| −29 | 10 | −6 | −15 | 0 | +50 | 0 | +45 | −71 | +3 | −49 |
| +16 | 10 | 44 | −15 | +45 | 0 | 0 | 0 | −71 | +3 | +46 (3) |
| +16 | 10 | −6 | −15 | +45 | +50 | 0 | 0 | −71 | +3 | −4 (4) |

It will be noted from the above table that there are four cases, (1), (2), (3) and (4), where the receiving volume $V_R$ is $>-9$VU. If the sum of the losses of A2, A3 and A4 can never be $<55$ decibels, its receiving volume $V_R$ in these four cases will be held to −9VU as seen from the following table:

| $V_T$ (VU) | A5 (db) | $S_R$ (db) | $S_T$ (db) | A1 (db) | A2 (db) | A3 (db) | A4 (db) | C (db) | EM (db) | $V_R$= +46−A1−A2−A3−A4 (VU) |
|---|---|---|---|---|---|---|---|---|---|---|
| +16 | 0 | 44 | −25 | +45 | 0 | +10 | +45 | −71 | +48 | −9 |
| −29 | 10 | 44 | −15 | 0 | 0 | 0 | +55 | −71 | +13 | −9 |
| +16 | 10 | 44 | −15 | +45 | 0 | 0 | +55 | −71 | +58 | −9 |
| +16 | 10 | −6 | −15 | +45 | +50 | 0 | +5 | −71 | +8 | −9 |

One mechanical linkage for controlling the adjustments of the attenuators A1 to A5 to accomplish the purposes of the invention is shown in Fig. 3. It includes a shaft 1 suitably mounted on panel CP, fixed at one end axially to the receiving sensitivity control dial 2 and at the other end axially to the gear 3 so that rotation of dial 2 in one direction or the other produces a corresponding rotation of gear 3. A second shaft 4 mounted as shown on panel CP in parallel with the shaft 1, is fixed at one end axially to the transmitting sensitivity control dial 5 and at the other end axially to the gear 6 so that rotation of dial 5 in one direction or the other will produce a corresponding rotation of gear 6.

A third shaft 7 and a fourth shaft 8 are mounted end to end on panel CP as shown, in parallel with the shafts 1 and 4. The transmitting volume control dial 9 is affixed axially to one end of the shaft 7 farthest from shaft 8, and a disc 10 is affixed axially to the shaft 7 at an intermediate point thereon so that rotation of the dial 9 in one direction or the other will produce a corresponding rotation of the disc 10. A second disc 11 identical with disc 10, is affixed axially to the shaft 8 at an intermediate point therealong and a gear 12 is mounted axially in bearings near the end of shaft 8 farthest from shaft 7 so that the latter gear is adapted to rotate freely on shaft 8. The free ends of the shafts 7 and 8 are held in juxtaposition by the bearings of each shaft, and a helical spring 13 encircling the extensions of the two shafts 7 and 8 is affixed at its opposite ends to the near faces of the discs 10 and 11, respectively. A stop pin 14 is affixed to the face of disc 10 nearest disc 12 at a point near the periphery of disc 10, and extends in a direction parallel to that of shaft 7 to a given point between discs 10 and 11. A similar stop pin 15 is affixed to the face of the gear 12 nearest disc 11 at a radial distance from shaft 8 approximately the same as that of stop pin 14 from shaft 7. Similar stop plates 16 and 16′ are affixed to the opposite faces of the disc 11 at a mean distance radially from shaft 8 approximately equal to the mean distances radially of the stop pins 14 and 15 from shafts 7 and 8, respectively, and extend in a direction parallel to that of shafts 7 and 8 to given points between discs 10 and 11, and between gear 12 and disc 11, respectively, such that for certain rotated positions of the discs 10 and 11, the pin 14 will bear against the stop plate 16, and for certain rotated positions of the disc 11 and the gear 12, the stop plate 16′ will bear against the stop pin 15. The spring 13 serves to hold pin 14 and plate 16 in contact so that the motion of shaft 7 is transmitted to shaft 8 unless pin 15 prevents it.

The movable arms of the variable attenuator A2 in the receiving circuit RC of Fig. 2 are so connected to the shaft 1 that when the dial 2 is turned clockwise or counter-clockwise (as seen from the front of panel CP) by the technical operator to increase or decrease the receiving vodas sensitivity to the desired value, the loss value of that attenuator in RC is decreased or increased, respectively, by the same amount, and the gear 3 rotates in the same direction a corresponding amount. The movable arms of the attenuator A5 in the transmitting vodas branch TS and of the attenuator A3 in the receiving circuit RC are reversely connected to the shaft 4 so that when the technical operator turns the dial 5 clockwise (as seen from the front of the panel CP) to increase the sensitivity of the transmitting vodas branch TS to the desired value, the loss value of attenuator A5 in TS is reduced and the loss value of the attenuator A3 in RC is increased by the same amount; and when the technical operator turns dial 5 counterclockwise the loss value of attenuator A5 in TS is increased and the loss value of the attenuator A3 in RC is reduced by the same amount.

The movable arms of the attenuator A1 in the transmitting circuit TC and the movable arms of the attenuator A4 in the receiving circuit RC are reversely connected to the shafts 7 and 8, respectively. Thus, when the technical operator turns the transmitting volume dial 9 clockwise (as seen from the front of the panel CP) to raise the outgoing transmitted volume, the loss value of attenuator A1 in TC is decreased and, because of the stop pin 14 of disc 10 bearing against stop plate 16 of disc 11 positive motions are imparted to shaft 8 and thus to the movable arms of attenuator A4 such that the loss value of the latter attenuator in RC is increased step by step in the same amounts. Similarly, when the technical operator turns the transmitting volume control dial 9 counter-clockwise to reduce the outgoing transmitted volume, the loss value of the attenuator A1 in TC is increased. The spring 13 has enough tension holding the stop plate 16 of disc 11 against the stop pin 14 of disc 10 so that the shaft 8 is also rotated so as to cause the loss of the attenuator A4 in RC to be decreased step by step in the same amount as the loss of the attenuator A1 in TC is increased unless the action of pin 15 prevents it. The various elements of the arrangement of Fig. 3 controlling the adjustments of the attenuators A1 and A4 are designed and relatively arranged so that when pin 14 is touching plate 16 the sum of the losses of attenuators A1 and A4 is 45 decibels, i. e., when the loss of A1 is zero the loss of A4 is 45 decibels, and when the loss of A1 is 25 decibels the loss of A4 is 20 decibels, etc. This is in spite of the fact that the attenuator A4 may provide a total loss of 55 decibels. The above tables show this clearly. As shown, the stop pin 15 of gear 12 does not engage stop plate 16′ of disc 11, so each dial 2, 5 and 9 controls its own attenuators as described with no linkage between these dials.

The phase between the gear 12 carrying stop pin 15, and gear 3 and between gear 12 and gear 6, must be so adjusted that when the algebraic sum of the losses inserted by attenuators A2, A3 and A4 into the receiving circuit RC in response to manual operation of the dials 2, 5 and 9 by the technical operator equals the minimum value which will restrict the receiving volume delivered by the control terminal over the line L to the listening local subscriber to the maximum comfort value, the stop pin 15 on gear 12 will just make contact with the stop plate 16′. For the particular loss values of the attenuators and gains of the amplifiers used and the assumed incoming and outgoing speech levels, this minimum value for the net loss in the receiving circuit is 55 decibels. The proper phase adjustment is produced by the set of gears connecting gear 12 to gears 3 and 6. This set of gears includes the differential gears consisting of the four meshing bevel gears 17, 18, 19 and 20. The bevel gear 19 is attached by its axial shaft 21 axially to the gear 22 which meshes with the gear 3. The bevel gear 20 is attached by its axial shaft 23 axially to the gear 24 meshing with the gear 12. A gear 25 freely rotatable in bearings on the shaft 23 meshes with the gear 6. The bevel gears 17 and 18 are idler gears rotatable freely in bearings on the common shaft 26 rigidly supported at its ends by the members 27 and 28 in turn rigidly attached to the face of the gear 25 at respective points equidistant from the axis of rotation of the latter.

Each of the gears 12, 24, 22 and 3 has the same number of teeth. Each of the bevel gears 17, 18, 19 and 20 also has the same number of teeth. The gear 6 has one-half as many teeth as gear 25. It is assumed that all of the variable attenuators A1 to A5 have the same number of degrees of rotation for 2.5 decibel steps of loss.

When the receiving sensitivity control dial 2 is rotated in the clockwise direction (as seen from the front of the panel CP), the loss of attenuator A2 in RC will be decreased to effectively increase the sensitivity of the receiving vodas branch RS, and the gear 3 will be rotated clockwise by the same amount producing a corresponding clockwise rotation of gear 22 and of the bevel gear 19 through shaft 21. This will produce a corresponding rotation of the idler bevel gears 17 and 18 on shaft 26, meshing with the gear 19, one in the clockwise direction and the other in the counter-clockwise direction. Assuming that the shaft 26 is held in a fixed position because of non-rotation at the time of the transmitting sensitivity control dial 5, the other bevel gear 20 meshing with gears 17 and 18 will be rotated counter-clockwise by a corresponding amount. This motion will produce a corresponding counter-clockwise rotation of the gear 24 through shaft 23 and corresponding clockwise rotation of the gear 12 on shaft 8. Thus, as the receiving vodas branch sensitivity is increased by the decrease in the loss of the attenuator A2 in the input of RC with the turning of the receiving sensitivity dial 2 clockwise, the clockwise rotation of gear 12, due to the stop pin 15 bearing against the stop plate 16′, will cause the disc 11, the shaft 8 and the movable arms of the attenuator A4 connected to that shaft to be moved clockwise so as to increase the loss of the latter attenuator, decibel for decibel, with the decrease in loss of attenuator A2 and thus maintain the algebraic sum of the losses of the attenuators in RC at the required minimum value (55 decibels). On the other hand, if before the engagement of the stop pin 15 on gear 12 with the stop plate 16′ on disc 11, the transmitting volume is reduced by the turning of the transmitting volume control dial 9 counter-clockwise (as seen from the front of the panel CP) to increase the loss of attenuator A1 in the transmitting circuit TC, a corresponding amount of loss will be removed from the attenuator A4 in the receiving circuit RC to hold the sum of the losses of the attenuators in RC as low as possible until the minimum value (55 decibels) is reached, at which point the movable arms of the variable attenuator A4 are prevented from moving farther by the engagement of the stop pin 15 of gear 12 and stop plate 16′.

When the receiving sensitivity control dial 2 is rotated in the counter-clockwise direction, the loss of the attenuator A2 in RC will be increased to effectively decrease the sensitivity of the receiving vodas branch RS and the gear 3 will be rotated counter-clockwise by the same amount. This, through rotation of the gears 22, 19, 17, 18, 20 and 24 in the manner previously described but in the opposite directions will result in the counter-clockwise rotation of gear 12 on shaft 8. Unless the stop pin 14 of the disc 10 bearing against the stop plate 16 on disc 11 under control of adjustment of the transmitting volume control dial 9 prevents it, the stop pin 15 bearing against stop plate 16′ of disc 11 will cause the disc 11, shaft 8 and the movable arms of the attenuator A4 to be moved counter-clockwise so as to reduce the loss of the latter attenuator, decibel for decibel, with the increase in the loss of the attenuator A2 thus maintaining the algebraic sum of the losses of the attenuators in RC at the required minimum value (55 decibels).

If, with gear 19 stationary due to non-rotation of the receiving sensitivity control dial 2, the transmitting sensitivity control dial 5 is rotated in the clockwise direction to reduce the loss of the attenuator A5 in the transmitting vodas branch TS increasing the sensitivity of the latter branch, and to increase the loss of the attenuator A3 in the receiving circuit RC by the same amount, the corresponding clockwise angular rotation of the gear 6 will produce a clockwise rotation of the gear 25 over half that angle (due to the fact that there are twice as many teeth in gear 25 as there are teeth in gear 6). Because of the fixed attachment of the supporting members 27 and 28 for shaft 26 to the face of gear 25, this will cause the tilting of the idler shaft 26 and the gears 17 and 18 rotatable freely thereon clockwise over a corresponding angle. This will produce a clockwise angular rotation of the gear 20 meshing with gears 17 and 18 and thus of the gear 24 connected through shaft 23 to the gear 20, which in turn will cause a counterclockwise rotation of the gear 12 meshing with gear 24. If pin 15 at this time is in contact with plate 16′, this will cause the attenuation of A4 to be reduced unless pin 14 bearing against stop plate 16 prevents it. If pin 15 is not at this time in contact with plate 16′, the only effect is to rotate pin 15.

If the transmitting sensitivity control dial 5 is rotated in the counter-clockwise direction to increase the loss of attenuator A5 and thus to reduce the sensitivity of the transmitting vodas branch, and to decrease the loss of the attenuator A3 in RC by the same amount, the corresponding counter-clockwise angular rotation of gear 6 will produce a counter-clockwise rotation of gear 25 over half that angle. This, through supporting members 27 and 28 for shaft 6, fixed to the face of gear 25, will cause the tilting of the idler shaft 26 and the gears 17 and 18 freely rotatable thereon counter-clockwise over a corresponding angle. The resultant rotation of gears 20, 24 and 26 in the manner previously described but in the opposite directions will finally result in a clockwise rotation of the gear 12 on shaft 8. If pin 15 is at this time in contact with the stop plate 16′ this will cause the loss of attenuator A4 to be increased unless the pin 14 bearing against stop plate 16 under control of the transmitting volume control dial 9 prevents such adjustment. If pin 15 at the time of rotation of gear 12 is not in contact with the stop plate 16′ the only effect will be the rotation of pin 15.

It is apparent that there must be enough friction in the three dials 2, 5 and 9 so that when the stops engage, the spring 13 does not turn the dial which is supposed to be at rest. The spring 13 must be strong enough, however, to insure that the adjustment of loss in the attenuator A4 in RC follows the adjustment of loss in the attenuator A1 in TC when there is no engagement, i. e., the spring 13 must be able to move the movable arms of the attenuator A4. This means a marginal requirement on the tension of the spring 13 and a minimum amount of friction in the three dials 2, 5 and 9. Alternatively, the controls for the variable attenuators A1 and A2 may be provided with detents having considerable friction and that for attenuator A4 with no detent. Spring 13 must then be made strong enough to turn the movable arms of attenuator A4 but not strong enough to overcome the detents.

The equipment on the control panel CP in accordance with the invention illustrated in Figs. 4 and 5 differs essentially from that illustrated in Figs. 2 and 3 merely in the use of a different arrangement for taking care of changes in transmitting sensitivity and the use of a different gearing arrangement for coupling gear 3 to gear 12. This alternative equipment will now be described.

As shown in Fig. 4, two 5-decibel attenuators A6 and A7 connected in tandem and controlled electrically by the switching relays R4 and R5, respectively, are substituted for the single mechanically-controlled variable attenuator A5 (Fig. 2) in the input of the transmitting vodas branch TS, and two 5-decibel attenuators A8 and A9 connected in tandem and controlled electrically by the switching relays R6 and R7, respectively, are substituted for the mechanically-controlled variable attenuator A3 (Fig. 2) in the receiving circuit RC between the point B and the input of the receiving amplifier RA. The operating winding of relay R4 is connected in series between the (AVE) contact 29 of a switch S1 associated with the transmitting sensitivity control and the positive terminal of the battery 30 having its negative terminal electrically grounded. The operating winding of relay R5 is connected in series between the (MIN) contact 31 of switch S1 and the positive terminal of battery 30. The operating winding of relay R6 is connected in series between the (AVE) contact 29 of switch S1 and the positive terminal of battery 32 having its negative terminal electrically grounded. The operating winding of relay R7 is connected in series between the (MIN) contact 31 of switch S1 and the positive terminal of battery 32. The contacts 29 and 31 are arranged in an arc having a mean radius equal to the distance from the pivoting point of switch arm 41 to the center line of the arcuate wiper 33 attached to the other end of arm 41.

As shown in Fig. 5, the sleeve 34 mounted to rotate in the bearing 35 loosely surrounds the shaft 1 to which the receiving sensitivity control dial 2 and the movable arms of the attenuator A2 in the input of the receiving circuit RC, are attached in the manner described previously in connection with Fig. 3. The gear 3, which in the arrangement of Fig. 3 was affixed axially to one end of shaft 1, in the arrangement of Fig. 5 is affixed axially to the sleeve 34 so that it is rotatable therewith in the bearing 35. The independent shaft 4 and associated transmitting sensitivity control dial 5 and gear 6 utilized in the arrangement of Fig. 3 are eliminated in the arrangement of Fig. 5 and are replaced by a gear 36 mounted axially tightly on sleeve 34, a gear 37 meshing with the gear 36 and affixed axially to a shaft 38, the shaft 38 being connected at one end through the detent mechanism 39 to the transmitting sensitivity control knob 40 which is mounted on the receiving sensitivity control dial 2 and rides around on it. The electrically grounded movable arm 41 of switch S1, disposed at right angles to shaft 38 and having one end affixed to the other end of that shaft is adapted to be rotated by that shaft when the transmitting sensitivity control knob 40 is rotated in one direction or the other. The movable arm 41 is shown as electrically insulated from shaft 38 but does not need to be so insulated if all gears are assumed to be grounded. The arm 41 terminates in an arcuate metal wiper 33 which as the arm is rotated sweeps over the metal contacts 29 and 31 to successively connect electrical ground to these contacts.

The train of gears 17 to 20, 22, 24 and 25 and their associated shafts and bearings used in the arrangement of Fig. 3 for providing the desired coupling between gear 12 and gear 13 and between gear 12 and gear 6 are eliminated in the arrangement of Fig. 5 which employs the idler gear 42 connected between and meshing with the gears 3 and 12.

When the transmitting sensitivity control knob 40 is held in one extreme position of adjustment, the arcuate wiper 33 on movable arm 41 of switch S1 is held out of contact with the switch contacts 29 and 31, and no energizing circuits are closed from the battery 30 or 32 for the relays R4 to R7 controlling the adjustment of the attenuators A6 to A9. In that case, the contacts of the unenergized relays R4 to R7 will be in the positions indicated in Fig. 4 in which the series resistance arms of attenuators A6 and A7 are short-circuited and the shunt resistance arms of these attenuators are open; and the short-circuiting connections around the series arms of attenuators A8 and A9 are open and the shunt resistance arms of the latter attenuators are closed. In that condition of the switch S1, the attenuators A6 and A7 will insert substantially no loss in the input of the transmitting vodas branch TS so the latter has its maximum sensitivity and the attenuators A8 and A9 insert a maximum loss (10 decibels) in the receiving circuit RC to maintain the required echo margin around the loop.

When the technical operator turns the transmitting sensitivity control knob 40 counter-clockwise (as seen from the front of panel CP) sufficiently so that the arcuate wiper 33 of arm 41 rests on the (AVE) contact 29 of switch S1, energizing circuits are closed for relays R4 and R6 from batteries 30 and 32, respectively, causing the operation of these relays. The operation of relay R4 causes its back contacts to be opened to remove the normal short-circuiting connection across the series resistance arms of attenuator A6 and its front contacts to be closed to close the normal open circuit in its shunt resistance arm, thus effectively inserting the loss (5 decibels) of attenuator A6 into the input of the transmitting vodas branch TS to reduce its sensitivity by a corresponding amount. The operation of relay R6 will cause its back contacts to be closed to connect a short-circuiting connection across the series resistance arms of the attenuator A8 and its front contacts to be opened to open the shunt resistance arm of that attenuator. Thus the loss of 5 decibels normally inserted in the receiving circuit RC by attenuator A8 will be effectively removed from that circuit to compensate for the reduced sensitivity of the transmitting vodas branch TS and maintain the echo margin.

Similarly, when the technical operator turns the transmitting sensitivity control knob 40 counter-clockwise to the point where the arcuate wiper 33 of switch arm 41 makes contact with the (MIN) contact 31 on switch S1, energizing circuits will be closed for switching relays R5 and R7 from batteries 30 and 32, respectively. The resultant operation of relay R5 will open the normally closed back contacts of this relay and close its normally open back contacts to respectively remove the normal short-circuiting connection around the series resistance arms of attenuator A7 and close the shunt resistance arm thereof, so that the 5-decibel loss of the attenuator A7 is inserted into the input of the transmitting vodas branch TS. The resultant operation of relay R7 will cause the back contacts of that relay to be closed and the front contacts thereof to be opened to respectively short-circuit the series resistance arms of attenuator A9 and close its shunt resistance arm, thereby effectively removing the normal 5-decibel loss of attenuator A9 from the receiving circuit RC. The arcuate wiper 33 of switch arm 41 is of such length that for this condition of rotation of the transmitting sensitivity control knob 40, the wiper 33 rests on the (AVE) contact 29 as well as on the (MIN) contact 31 of switch S1. Thus, for this operated condition, the 5-decibel loss of each of the attenuators A6 and A7 is inserted in the transmitting vodas branch TS to lower its sensitivity by 10 decibels and the 5-decibel loss of each of the attenuators A8 and A9 is effectively removed from the receiving circuit RC so that the loss of the latter circuit is decreased by 10 decibels to give as high a received volume as possible to the land line L and still maintain echo margin.

As in the case of the similar controls of Fig. 3 described previously, when the technical operator turns the transmitting volume control dial 9 clockwise or counter-clockwise, the corresponding rotation of the shaft 7 controls the variable attenuator A1 in TC so as to cause its attenuation value to be decreased or increased, respectively, to adjust the transmitting volume in TC to the desired value and, because of the mechanical coupling provided between the shafts 7 and 8 by the spring 13, the stop pin 14 on disc 10 attached to shaft 7 and the stop plate 16 on disc 11 attached to shaft 8, shaft 8 will be rotated to control the variable attenuator A4 to increase or decrease, respectively, the loss in RC in corresponding amounts so as to maintain echo margin.

If the transmitting sensitivity control knob 40 is left stationary, then when the technical operator turns the receiving sensitivity control dial 2 and thus shaft 1 clockwise or counter-clockwise to adjust attenuator A2 in the input of the receiving circuit RC so as to bring the sensitivity of the vodas receiving branch RC to the desired setting, sleeve 34 and therefore gear 3 attached thereto will be rotated a corresponding amount in the same direction due to the mechanical coupling between sleeve 34 and dial 2 provided by the meshing gears 36 and 37, shaft 38 and detent mechanism 39. If then, with the receiving sensitivity control dial 2 stationary, suppose the technical operator rotates the transmitting sensitivity control knob 40 on dial 2, and thus shaft 38 in one direction or the other to a different position so as to electrically control through switch S1, as previously described, the loss values of the attenuators A6 and A7 in the input of the vodas transmitting branch TS to adjust the sensitivity of that branch to the desired value, and the loss values of the attenuators A8 and A9 in the receiving circuit RC to provide a compensating loss change in that circuit to maintain echo margin. Then, the sleeve 34 and thus the gear 3 attached thereto will be rotated a corresponding amount in the opposite direction due to the mechanical coupling provided between that sleeve 34 and knob 40 by the meshing gears 36 and 37, the shaft 38 and the detent mechanism 39. Thus a desired phase shift has been introduced between shaft 1 and sleeve 34, corresponding to the phase shift introduced by the differential gearing in the arrangement of Fig. 3.

The rotation of the gear 3 for both the vodas receiving branch sensitivity and the vodas transmitting branch sensitivity adjustments are transmitted into the same rotation of a corresponding amount in the gear 12 rotating freely on the shaft 8, due to the coupling of gear 3 through idler gear 42 to gear 12. The main function of the idler gear 42 is to insure that the rotations of the dials 9 and 2 are in a desirable direction, i. e., so that the clockwise rotation, from the front of panel CP, of transmitting volume control dial 9 will adjust the attenuator A1 so as to increase the transmitting volume in TC and the clockwise rotation of the receiving sensitivity control dial 2 will adjust the attenuator A2 in the input of RC so as to effectively increase the sensitivity of the vodas receiving branch RS.

By suitable design of the mechanical coupling between the sleeve 34 and the transmitting sensitivity control knob 40 and the receiving sensitivity control dial 2, the phase shift between the gear 12 and gear 3 is adjusted so that when the algebraic sum of the losses inserted by the variable attenuators A2, A4, A8 and A9 in the receiving circuit RC in response to manual operation by the technical operator of dial 2, dial 9 and knob 40, respectively, equals the minimum value (55 decibels for the particular values of the attenuators, the particular gains of the amplifiers used and the assumed incoming and outgoing speech levels), which will restrict the receiving volume delivered by the control terminal over the line L to the listening local subscriber to the maximum comfort value, the stop 15 on gear 12 will just make contact with the stop plate 16′ on disc 11. Then, if the sensitivity of the vodas receiving branch RS is increased further by reducing the loss of attenuator A2 or the sensitivity of the vodas transmitting branch TS is decreased further resulting in further reduction of the loss of attenuators A8 and A9 in the receiving circuit RC, the resulting rotation of the gear 12, because of pin 15 bearing against stop plate 16′, will cause the loss of the attenuator A4 in RC to be increased, decibel for decibel, to maintain the algebraic sum of the losses in the receiving circuit at the required minimum value (55 decibels). If before the engagement of the stop pin 15 with stop plate 16′, the transmitting volume is reduced by turning the transmitting volume control dial 9 counter-clockwise the resultant rotation of shaft 8 due to the tension of the spring 13 holding stop plate 16 against the stop pin 14, will cause the loss of attenuator A4 to be reduced until the algebraic sum of the losses in the receiving circuit RC again is equal to 55 decibels at which point further adjustment of attenuator A4 is prevented by the engagement of the pin 15 on gear 12 and the stop plate 16′.

Various modifications of the arrangements illustrated and described above which are within the spirit and scope of the invention will occur to persons skilled in the art.

What is claimed is:

1. In a control terminal for controlling signal transmission in opposite directions between a two-way line connectable to the subscriber stations of a voice frequency telephone network and the radio transmitter and receiver at one end of a two-way radio telephone system, including one one-way amplifying path for repeating outgoing telephone signals received over said line from a subscriber station to said radio transmitter for radiation thereby, a second oppositely-directed one-way amplifying path for repeating incoming voice frequency telephone signals detected by said radio receiver to said line for transmission thereover to a subscriber station and a vodas switching circuit having a transmitting branch connected to said one path and controlled by the outgoing signals therein and a receiving branch connected to said second path and controlled by the incoming signals therein, for directionally controlling signal transmission through said terminal while suppressing echoes and preventing singing: means to insure proper operation of said terminal over a wide range of line and radio noise conditions encountered in service comprising three variable attenuators respectively connected in said one path and in the inputs to said vodas transmitting and receiving branches; three manual controls operable by the technical operator of the terminal to separately adjust the loss value of a different one of said three variable attenuators so as to make the outgoing signal volume level in said one path and the sensitivities of said vodas transmitting and receiving branches, respectively, of the optimum values for the existing noise conditions in said range; variable attenuation means in said second path, comprising a plurality of tandem-connected portions; a mechanical linkage interconnecting different portions of said variable attenuation means with a different one of said three manual controls in such manner that when the latter are adjusted to the desired settings the loss value of said variable attenuation means will be automatically adjusted to maintain satisfactory echo margin in said terminal and means for restricting the volume of the signals delivered by said terminal over said line to a subscriber station to a maximum value tolerable to the ear of a listening subscriber thereat comprising means for mechanically interlocking said different portions of said variable attenuation means so as to effectively add algebraically the losses inserted in said second path for any adjusted positions of said three manual controls and other mechanical means automatically responsive to a reduction in the net loss of said variable attenuation means to the minimum value which will restrict the volume of the signals delivered to the subscriber station to said maximum tolerable value, to prevent further reduction of the loss of said variable attenuation means.

2. The control terminal of claim 1, in which the one of said three variable attenuators controlling the sensitivity of said vodas receiving branch is located in said second path in front of the point of connection of that branch thereto, said variable attenuation means is located in said second path beyond the point of connection of said vodas receiving branch thereto, each of said manual controls comprises a rotatable dial having a shaft axially affixed thereto, the shaft of each of said dials being mechanically connected to a different one of said three variable attenuators in such manner that manual rotation of a dial with its shaft by the technical operator in one or the opposite direction will increase or decrease, respectively, the loss value of the attenuator connected thereto, said mechanical linkage comprises means mechanically connecting the shafts of the two dials respectively controlling the attenuators in said vodas transmitting branch and in said one path to different portions of said variable attenuation means in said second path in such manner that when either of said two dials and its shaft is rotated in said one or said opposite direction so as to increase or decrease, respectively, the loss in said vodas transmitting branch or in said one path by a given amount, the loss value of said variable attenuation means in said second path is automatically decreased or increased, respectively, by the same amount, said interlocking means including a set of differential gears for mechanically coupling the shafts of the three manual controls.

3. The control terminal of claim 1, in which the one of said three variable attenuators controlling the sensitivity of said vodas receiving branch is located in said second path in front of the point of connection of that branch thereto, said variable attenuation means includes a fourth and a fifth variable attenuator connected in tandem in said second path beyond the point of connection of said vodas receiving branch thereto, each of said three manual controls comprises a separate rotatable dial having a shaft axially affixed thereto, each of the shafts of the three dials being mechanically connected to a different one of said three attenuators in such manner that manual rotation of a dial and its shaft in one or the opposite direction by the technical operator increases or decreases, respectively, the loss value of the attenuator connected thereto, said mechanical linkage comprises means mechanically connecting the shaft of one dial controlling the variable attenuator in said one path to said fourth variable attenuator and the shaft of a second dial controlling the variable attenuator in the input of said vodas transmitting branch to said fifth variable attenuator in such manner that the rotation of said one or said second dial in said one or said opposite direction to increase or decrease, respectively, the loss value of said second or said third variable attenuator by a given amount, automatically decreases and increases, respectively, the loss value of said fourth or said fifth attenuator, respectively, in said second path by the same amount, said means for interlocking said different portions of said variable attenuation means comprises differential gearing means interlocking said one variable attenuator and said fifth variable attenuator with said fourth variable attenuator and said other mechanical means includes a spring and stop mechanism for effectively providing slipping between the interlocked attenuators in said second path over the high volume portion of the range of adjustment.

4. The control terminal of claim 1, in which one of said three variable attenuators is inserted in said second path in front of the point of connection of said vodas receiving branch thereto so as to effectively control the sensitivity of that branch in accordance with its setting, said variable attenuation means includes a fourth and a fifth variable attenuator inserted in tandem in said second path beyond the point of connection of said vodas receiving branch thereto, each of said manual controls comprises a rotatable dial having a shaft axially affixed thereto, the shaft of each of the dials being mechanically connected to a different one of said three variable attenuators in such manner that manual rotation of a dial in one or the opposite direction will increase or decrease, respectively, the loss value of the attenuator connected thereto in an amount proportional to the degree of rotation, said mechanical linkage includes means mechanically connecting the shaft of the one of said dials controlling the attenuator in said one path and the shaft of a second of said dials controlling the attenuator in said transmitting vodas branch to said fourth and said fifth variable attenuator, respectively, in such manner that when the loss value of the attenuator in said one path or of the attenuator in said vodas transmitting branch is increased or decreased by rotation of the associated dial the loss value of said fourth or said fifth variable attenuator is decreased or increased, respectively, by a corresponding amount to maintain echo margin in said terminal, said interlocking means includes gearing for mechanically coupling said one and said fifth variable attenuators with said fourth variable attenuator and said other mechanical means includes a spring and stop arrangement associated with said fourth attenuator for preventing its further adjustment when the net loss of said variable attenuation means has been reduced to said minimum value.

OWEN R. GARFIELD.

REFERENCES CITED

The following references are of record in the file of this patent:

UNITED STATES PATENTS

| Number | Name | Date |
|---|---|---|
| 2,206,146 | Wright | July 2, 1940 |
| 2,224,569 | Dickieson | Dec. 10, 1940 |
| 2,273,945 | Fisher | Feb. 24, 1942 |
| 2,510,975 | Hawks | June 13, 1950 |